Dec. 23, 1969  A. WELLS  3,485,504

COMPOSITE SEALING RINGS

Filed April 5, 1965  2 Sheets-Sheet 1

Inventor
ALAN WELLS

By
Holcombe, Wetherill & Brisebois
Attorneys

Dec. 23, 1969  A. WELLS  3,485,504
COMPOSITE SEALING RINGS
Filed April 5, 1965  2 Sheets-Sheet 2

Inventor
ALAN WELLS
By
Holcombe, Wetherill + Brisebois
Attorneys

United States Patent Office 3,485,504
Patented Dec. 23, 1969

3,485,504
COMPOSITE SEALING RINGS
Alan Wells, Bradford, England, assignor to Hepworth & Grandage Limited, Bradford, England, a British company
Filed Apr. 5, 1965, Ser. No. 445,654
Claims priority, application Great Britain, Apr. 8, 1964, 14,584/64
Int. Cl. F16j *15/00, 9/06;* F16k *41/00*
U.S. Cl. 277—140                     2 Claims

ABSTRACT OF THE DISCLOSURE

This invention relates to a fully floating, non-bottoming, composite piston ring comprising a pair of split sealing rings spaced apart axially by a split annular spacer element which is circumferentially incompressible when its ends are in abutment, the annular spacer element being provided with a plurality of springs operable independently of each other to engage the sealing rings and expand them radially into engagement with a surface of a cylinder bore with which they are to slidably and sealingly co-operate.

---

Figure 1:
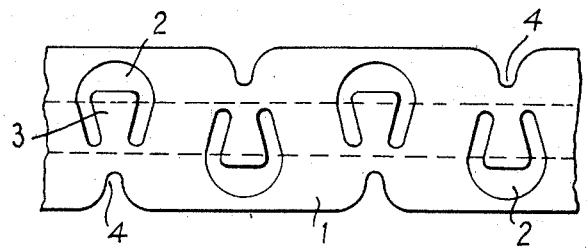

The present invention relates to composite sealing rings for sealing between two relatively reciprocable, generally circular-section, coaxial members. More particularly, the invention relates to a composite piston ring for internal combustion engines, compressors or the like, for example, a three piece ring comprising two split steel rails or sealing rings, and a resilient steel spacer element. The spacer element serves the dual purpose of axially spacing the two sealing rings apart, and of applying a radially outward pressure to the rings to urge them against the surface of a cylinder bore with which they cooperate.

It has previously been proposed to employ a spacer element in the form of a circumferentially-expandable, axially split ring, known as a spacer-expander spring, the adjacent ends of which are normally spaced apart, but which abut when the spring is compressed during use. Such a spacer element relies for its circumferential expansion or resilience, when its ends are in abutment, upon the deflection of a series of small interconnected elements, analogous to a compression spring.

This type of spacer element has the disadvantage that it is only as efficient as the weakest of the interconnected elements, and collapse of one or more of the latter elements results in failure of the spacer element, and therefore of the composite ring as a whole.

Moreover, since the radially outward pressure applied to the rails or sealing rings by the spacer element is entirely dependent upon the circumferential expansion of the spacer element, the spring rate of the latter must be designed to give a limited deflection, otherwise assembly of the composite ring into a cylinder bore is made difficult. In order to compensate for cylinder bore and/or ring wear, it is desirable to have the maximum possible deflection of the spacer element, but due to the previously mentioned assembly difficulty a compromise has to be made in the design of all composite ring assemblies of this type. This design of composite ring is also frequently impeded in its performance by the build up of friction between those portions of the spacer element which transfer the outward pressure to the rails, and the radially inner edges of the rails engaged by these portions.

It is an object of the present invention to provide annular sealing means, such as a composite piston ring, which avoids these disadvantages.

To this end, the present invention consists in annular sealing means comprising a sealing ring, a spacer element, and a plurality of springs, particularly leaf or cantilever springs, integral with the spacer element and operable independently of each other to engage the sealing ring and urge the latter into engagement with a surface with which it is to cooperate. Preferably, at least two sealing rings are provided, spaced apart axially by the spacer member and engaged by the springs.

Figure 2:
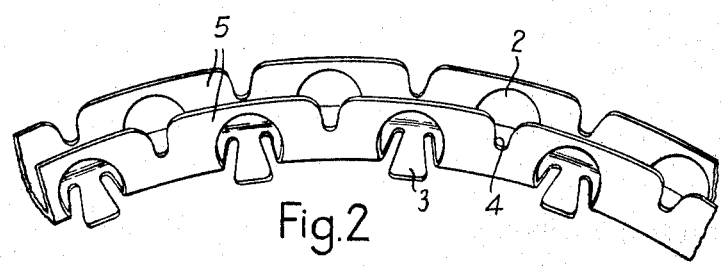

In order that the invention may be more readily understood, reference will now be made to the accompanying drawings, in which:

FIGURE 1 is a plan view of part of a spacer element blank, according to one embodiment of the invention, FIGURE 2 is a perspective view of part of a spacer element formed from the blank shown in FIGURE 1.

Figure 3:
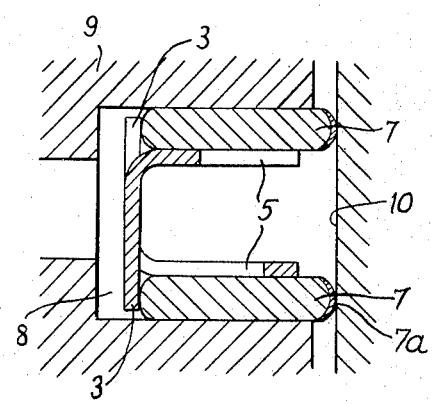
Figure 4:
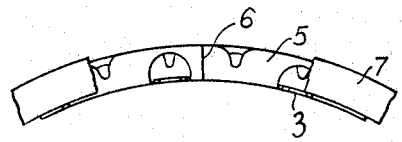
Figure 5:
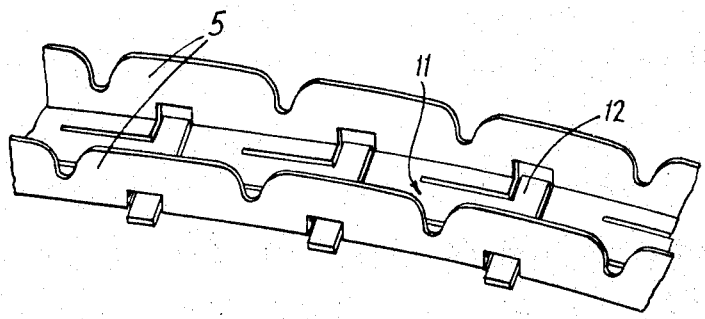
Figure 6:
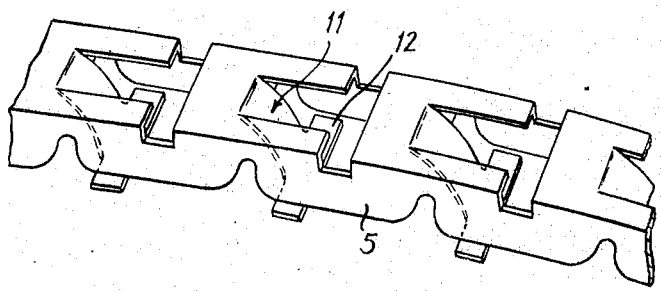

FIGURE 3 is a transverse section of a composite piston ring incorporating the spacer element shown in FIGURE 2, and assembled within a piston ring groove of a piston reciprocable in a cylinder bore of an internal combustion engine, FIGURE 4 is a plan view, partly in section, of part of the composite piston ring shown in FIGURE 3, FIGURE 5 is a perspective view of part of a spacer element according to a second embodiment of the invention, and FIGURE 6 is a perspective view of a part of a spacer element according to a third embodiment of the invention.

Referring to FIGURE 1, the spacer element blank is formed, for example, from spring steel strip 1, punched or otherwise formed with a plurality of alternate oppositely facing U-shaped slots 2 so as to provide integral tongues 3, which constitute leaf springs in the final spacer element, and with cut-outs 4 in opposite side edges of the strip 1. This blank is folded along the two broken lines into a channel section as shown in FIGURE 2 having two flanges 5, and this channel section is then formed into a ring of predetermined peripheral length.

The cut-outs 4 in the edges of the flanges 5 compensate for the material removed from around the tongue 3, to assist in the formation of a balanced or regular ring. The ends of the ring normally abut one another as shown at 6 in FIGURE 4, to provide a virtually solid, circumferentially incompressible ring. The tongues 3 are so dimensioned that the free ends thereof project axially of the flanges 5 of the channel section and are disposed radially inwardly of the flanges 5.

As shown in FIGURE 3, the spacer element or spacer-expander spring constitutes part of a composite piston ring which also includes a pair of split sealing rings or rails 7 which are positioned on the flanges 5 in axially spaced relationship. The rails 7 may be made from steel strip formed into a circle, the radially outer peripheral faces thereof being preferably coated with a wear-resistant material 7a for example, molybdenum or chromium. The radially inwardly facing edges of rails 7 engage the axially outer ends of the tongues 3.

In operation, the composite piston ring is confined in a groove 8 in a piston 9 reciprocable within a cylinder bore 10 of an internal combustion engine, the spacer element having its ends in abutment and being spaced from the base of the groove. The tongues 3 constitute cantilever or leaf springs which are adjusted to the spacer element and are individually deflected radially inwards by the radially inner edges of the rails 7 by a predetermined amount, the deflection being accommodated by flexing of the tongues 3 along their axial length. Consequently these springs exert a radial outward pressure on the rails 7 to expand them into sealing engagement with the cylinder bore 10.

The spacer element shown in FIGURE 5 is provided with a plurality of T-shaped leaf springs or tongues 11 which flex along their circumferential length instead of along their axial length. The cross-limb 12 of each tongue 11 projects axially beyond both flanges 5 of the channel section and engages with the radially inner edges of both rails (not shown) to provide the required outward pressure.

In the embodiments shown in FIGURES 1 to 5, the base of the channel section with which the tongues or leaf springs are integrally formed, is disposed radially inwards of the flanges 5. In the embodiment shown in FIGURE 6, however, the tongues 11 are bent or displaced in such a manner that when the blank strip is folded into a channel section, the axial ends of the cross limbs 12 are disposed against the side edges of the rail-supporting flanges 5. The channel section is subsequently formed into a ring with the base of the channel section disposed radially outwardly of the flanges 5.

The spacer elements hereinbefore described have the advantage that failure of any one tongue or spring will have only a proportionate effect on the performance of the composite ring as a whole since the spacer element will not collapse and the operation of the remaining tongues or springs will not be affected. Since the free ends of the spacer element abut, the element is virtually incompressible, and the dimensions of the spacer element do not effect the deflection or spring rate of the tongues or springs.

Each cantilever spring is designed to give optimum deflection, but since the length of the spacer element is unaffected by the spring rate or deflection, assembly of the composite ring is readily achieved by merely compressing the rails. The deflection of the springs is, furthermore, generally independent of both the ring groove depth and of the deflection of spacer elements.

Moreover, circumferential friction between the spacer element and rails is substantially eliminated.

It will be understood that various modifications may be made without departing from the scope of the present invention as defined in the appended claims. For example the tongues or springs may take various forms in addition to those hereinbefore described.

The spacer element may be inwardly springing, so that its free ends are normally urged into abutment; it may be formed so that the free ends are normally just touching, or slightly spaced apart, or alternatively the spacer element may be outwardly springing, in which case the free ends may or may not abut when the composite ring is in its operational position. In the case of an outwardly springing spacer element, the resilience of the tongues should be such that rails will compress the spacer element through the tongues until its free ends abut before the tongues themselves deflect.

The wear-resistant material may be omitted from the periphery of the rails, or additionally or alternatively, the inner faces thereof may be coated by a wear-resistant material.

Th invention although described with reference to piston rings, may be applied to other annular seals provided between relatively reciprocable or rotatable members. In this respect the rails or sealing rings may be inwardly instead of outwardly springing so as to seal around a shaft or the like surrounded by the sealing means.

The flanges of the spacer element may, if desired, be arranged to resiliently urge the rails located thereon into engagement with the sides of the piston ring groove, or alternatively these flanges may merely support the rails. Although it is preferred to employ a pair of rails, it is possible to use the spacer element with a single rail, or alternatively to locate two or more rails on one or both flanges of the spacer element.

I claim:
1. A composite sealing ring, including an axially split spacer element comprising a circumferentially extending U-shaped channel having two axially spaced limbs which constitute flanges and a connecting portion connecting said limbs, said channel opening generally radially outwardly, said limbs locating a pair of sealing rings in axially spaced relationship, said spacer element being constructed so as to be virtually circumferentially incompressible upon mutual abutment of the free ends thereof, said sealing rings and spacer element being adapted to be assembled together and located in an annular groove in one of a pair of relatively movable generally circular cross section coaxial members to form a seal therebetween, with said spacer element having its free split ends in abutment without bottoming in the grove, said spacer element including a plurality of individual cantilever leaf springs each attached directly to the connecting portion of the spacer element and operable independently of each other to engage the sealing ring and urge the latter into engagement with a surface with which it is to co-operate, each spring extending in a generally circumferential direction and being flexible along its circumferential length, said leaf spring being generally T-shaped and being disposed with its transverse limb projecting axially beyond both said flanges to engage the radially inner edges of both said sealing rings.

2. A fully floating, nonbottoming, composite piston ring for an internal combustion engine, comprising a split annular spacer element which is virtually incompressible circumferentially when its free ends are in abutment, said element comprising a strip of sheet metal folded up into a generally radially opening U-section annular channel including a pair of axially spaced generally circumferentially and radially extending flanges integrally and rigidly interconnected by a circumferentially and axially extending base member, and a plurality of individual circumferentially spaced springs integral with said base member, each spring comprising a cantilever leaf spring attached directly to said base member which spring extends in a generally circumferential direction and is flexible along its circumferential length, said cantilever leaf spring being generally T-shaped and being disposed with a transverse limb projecting axially beyond said flanges, a pair of split annular sealing rings located one on each flange and axially spaced apart by said spacer element, with the extremities of the transverse limbs of the springs engaging the radially inner edges of said sealing rings, said springs being operative independently of each other to urge said sealing rings outwardly into engagement with a surface with which they are to cooperate, without any resilient deformation of the annular channel.

References Cited

UNITED STATES PATENTS

| | | | |
|---|---|---|---|
| 2,817,564 | 12/1957 | Marien | 277—140 |
| 2,833,605 | 5/1958 | Shirk | 277—140 |
| 2,837,385 | 6/1958 | Mayfield | 277—140 |
| 2,886,384 | 5/1959 | Hamm | 277—140 |
| 2,999,728 | 9/1961 | Estey | 277—139 |
| 3,081,100 | 3/1963 | Nisper | 277—140 |

FOREIGN PATENTS

| | | |
|---|---|---|
| 706,669 | 3/1965 | Canada. |
| 907,729 | 10/1962 | Great Britain. |

LAVERNE D. GEIGER, Primary Examiner

JEFFREY S. MEDNICK, Assistant Examiner

267—1.5; 277—141, 149